United States Patent
Ambrose et al.

(10) Patent No.: US 6,500,545 B1
(45) Date of Patent: Dec. 31, 2002

(54) AMINOPLAST-BASED CROSSLINKERS AND POWDER COATING COMPOSITIONS CONTAINING SUCH CROSSLINKERS

(75) Inventors: Ronald R. Ambrose, Pittsburgh, PA (US); Anthony M. Chasser, Allison Park, PA (US); Shengkui Hu, Glenshaw, PA (US); John R. Schneider, Glenshaw, PA (US); Jackie L. Smith, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 163 days.

(21) Appl. No.: 09/666,175

(22) Filed: Sep. 21, 2000

(51) Int. Cl.$^7$ ............................................... B32B 27/38
(52) U.S. Cl. .................... 428/413; 428/418; 428/423.1; 428/458; 428/460; 428/463; 428/524; 525/427; 525/441; 525/484; 427/185
(58) Field of Search ................................. 428/413, 418, 428/423.1, 458, 460, 463, 524; 525/427, 441, 484; 427/185

(56) References Cited

U.S. PATENT DOCUMENTS

| | | | |
|---|---|---|---|
| 3,759,854 A | 9/1973 | Chang et al. ............... 524/538 |
| 3,904,623 A * | 9/1975 | Shay et al. ................. 544/186 |
| 3,980,732 A | 9/1976 | Isaksen et al. .............. 525/163 |
| 4,185,045 A | 1/1980 | Yoshihara et al. ........... 525/181 |
| 4,189,421 A * | 2/1980 | Shay .......................... 524/508 |
| 4,217,377 A * | 8/1980 | Shay .......................... 427/195 |
| 4,230,829 A | 10/1980 | Yoshihara et al. .......... 525/162 |
| 4,393,181 A | 7/1983 | Allen ......................... 525/504 |
| 4,698,401 A | 10/1987 | Klein et al. ................. 525/489 |
| 5,268,402 A | 12/1993 | Daio et al. ................... 524/100 |
| 5,302,462 A | 4/1994 | Shah et al. .................. 428/482 |

FOREIGN PATENT DOCUMENTS

| | | |
|---|---|---|
| GB | 622675 | 5/1949 |
| GB | 1 471 183 | 4/1977 |

* cited by examiner

Primary Examiner—Leszek Kiliman
(74) Attorney, Agent, or Firm—Diane R. Meyers; Deborah M. Altman

(57) ABSTRACT

The present invention provides a crosslinking agent having reactive benzoxazine groups which is the ungelled reaction product of (a) at least one mono-hydroxy aromatic compound and (b) at least one aminotriazine compound having one or less non-alkylated NH group present in a molar ratio of reactant (a) to reactant (b) ranging from 1.0 to 3.0: 1.0, provided that where reactant (a) is a single ring monohydroxy aromatic compound, the molar ratio of reactant (a) to reactant (b) ranges from 1.0 to 1.8:1.0 and from 2.2 to 3.0:1.0. The crosslinking agent is essentially free of hydroxyl functionality and has a glass transition temperature of at least 25° C. The present invention is further directed to a method for preparing the above-described crosslinking agent. Also provided is a curable powder coating composition comprising a solid particulate, film-forming mixture of (A) a polymer having functional groups reactive with aminotriazine and/or benzoxazine groups, the polymer having a glass transition temperature of at least 30° C.; and (B) the previously described crosslinking agent. Multilayer composite coating compositions are also provided including a base coat deposited from a film-forming composition and a topcoat over the base coat. The topcoat is deposited from the curable powder coating composition described above. The present invention further provides coated substrates.

64 Claims, No Drawings

AMINOPLAST-BASED CROSSLINKERS AND POWDER COATING COMPOSITIONS CONTAINING SUCH CROSSLINKERS

FIELD OF THE INVENTION

The present invention relates to crosslinkers based on aminoplast resins and mono-hydroxy aromatic compounds, to a method for preparing such crosslinking agents and to curable powder coating compositions containing such crosslinkers.

BACKGROUND OF THE INVENTION

In recent years, powder coatings have become increasingly popular because these coatings are inherently low in volatile organic content ("VOC"), which significantly reduces emissions of volatile organic compounds into the atmosphere during application and curing processes.

Hydroxyl, carboxyl, carbamate and/or epoxy functional resins, such as acrylic and polyester resins having relatively high glass transition temperatures ("Tg"), are commonly used as main film-forming polymers for these coatings. The relatively high Tg of such acrylic polymer systems provides powder coatings having good storage stability. However, when exposed to the extreme temperatures which can be encountered during shipping and/or storage in many geographic areas, even better powder coating stability is desired.

Aminoplast resins are well known in the art as low cost crosslinking agents for hydroxyl, carboxyl and/or carbamate functional polymers in conventional liquid coating compositions. Common aminoplast resins are based on condensation products of formaldehyde with an amino- or amido-group carrying substance. Condensation products obtained from the reaction of alcohols and formaldehyde with melamine, urea or benzoguanamine are most commonly used in liquid coating compositions where they provide enhanced coating properties such as exterior durability, chemical resistance and mar resistance. Such aminoplast resins typically are in liquid form and, as such, generally are not suitable for use in curable powder coating compositions.

The alkoxylated aldehyde condensates of glycoluril, which are solid products, are the aminoplast resins most commonly employed as crosslinking agents in powder coating compositions. Although in solid form, these materials nonetheless can depress the Tg of the powder coating composition significantly, even when combined with high Tg film-forming polymers such as the acrylic polymers described above. Such a depression in Tg also can result in poor powder stability.

Moreover, the use of conventional aminoplast resins in curable powder coating compositions can result in the phenomenon commonly referred to as "gassing". "Gassing" occurs as a result of vaporization of the alcohol generated in the thermally induced aminoplast crosslinking reaction. The alcohol vapor is driven off through the coating film upon heating and, as the viscosity of the coating increases during the curing process, pinholes or craters are formed as gases escape through coating surface.

U.S. Pat. Nos. 3,904,623, 4,189,421 and 4,217,377 disclose a solid, non-gelled low molecular weight addition reaction product and a method for preparing the reaction product. The addition reaction product is suitable for use as a crosslinking agent in powder coating compositions when combined with polymers having various reactive functional groups. The crosslinking agent is the reaction product of 1.8 to 2.2 moles of a monohydroxy-, single-ring aromatic compound, for example phenol, and 1.0 mole of an alkoxymethyl aminotriazine compound, such as hexakis (methoxymethyl) aminotriazine.

U.S. Pat. No. 4,393,181 discloses solid, adducts prepared from aminotriazine compounds and a large excess of polyhydric phenols. The adducts, due to their phenolic functionality, are useful as crosslinking agents for epoxy resins in powder coating compositions when used in conjunction with a curing agent accelerator such as an imidazole or benzimidazole.

U.S. Pat. No. 3,759,854 discloses heat-fusible powder coating compositions comprising a crosslinker prepared by pre-reacting a thermosetting polyester resin and a suitable conventional aminoplast crosslinking resin such as a condensation product of an aldehyde with melamine, urea or benzoguanamine.

U.S. Pat. No. 5,302,462 discloses a similar process for preparing a partially cured powder coating crosslinker. The crosslinker is prepared by partially reacting a less than stoichiometric amount of methoxymethyl aminotriazine with a linear, hydroxyl-terminated polyester.

U.S. Pat. No. 3,980,732 discloses a process for preparing a curable powder resin composition having a sintering temperature above 40° C. The method comprises partially reacting a methylolamino compound with an aliphatic alcohol and an aliphatic diamide to produce an aminoplast condensate with a $T_g$ ranging from −10° C. to 100° C. and blending the aminoplast condensate with an acrylic or polyester resin having a glass transition temperature ranging from 60° C. to 100° C.

U.S. Pat. No. 4,185,045 discloses a powder coating composition comprising a solid crosslinking agent having a softening point ranging from 50° C. to 120° C. and prepared by heating 40 to 75% by weight of an acrylic polyol and 60 to 25% by weight of an alkoxyaminotriazine at 50° to 120°, and a base resin having a softening point ranging from 60° C. to 130° C.

U.S. Pat. No. 4,230,829 discloses a solid crosslinking agent having a softening point of 50° C. to 120° C. and prepared by heating 40 to 70% by weight of a polyester polyol and 60 to 30% by weight of an alkoxyaminotriazine.

While the above-described prior art aminoplast-based crosslinkers for powder coating compositions provide some improvement in "gassing" and powder stability over their liquid aminoplast counterparts, the powder coating compositions containing these crosslinkers can, nonetheless, exhibit some of the aforementioned deficiencies. In addition, most of the crosslinkers disclosed in the prior art are high molecular weight, partially cured and, hence, unstable mixtures. Further, the crosslinkers described in U.S. Pat. Nos. 3,904,623, 4,189,421, and 4,217,377 contain a significant amount of unreacted phenol impurity, which significantly limit their use in the powder coatings industry.

Thus, there remains a need for an aminoplast crosslinking agent suitable for use in curable powder coating compositions which provides a storage stable powder composition having the desirable coating properties usually associated with aminoplast-based liquid coatings without causing coating surface defects due to "gassing".

SUMMARY OF THE INVENTION

In accordance with the present invention, provided is a crosslinking agent having reactive benzoxazine groups comprising the ungelled reaction product of (a) at least one mono-hydroxy aromatic compound having the following structure (I):

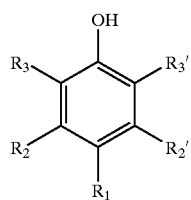

wherein $R_1$ represents a monovalent hydrocarbon group, $COOR_5$ where $R_5$ represents H or a monovalent hydrocarbon group, $NO_2$, halogen or $XR_4$, where X represents O or S and $R^4$ represents a monovalent hydrocarbon group having 1 to 8 carbon atoms; $R_3$, $R_3'$, $R_2$ and $R_2'$ can be the same or different and each independently represents a substituent selected from H, a monovalent hydrocarbon group, $COOR_5$, $NO_2$, halogen and $XR_4$, provided that at least one of $R_3$ and $R_3'$ is H; or, when $R_3$ is other than H (i.e., "non-hydrogen substituted") and $R_3'$ is H, $R_1$ and $R_2$ taken together, $R_1$ and $R_2'$ taken together, or $R_2$ taken together with the non-hydrogen substituted $R_3$ represent fused aliphatic or aromatic ring structures; or, when $R_3'$ is non-hydrogen substituted and $R_3$ is H, $R_1$ and $R_2$ taken together, $R_1$ and $R_2'$ taken together, or $R_2'$ taken together with the non-hydrogen substituted $R_3'$ represent fused aliphatic or aromatic ring structures; and (b) at least one aminotriazine compound having one or less non-alkylated NH group. Reactants (a) and (b) are present in a molar ratio of reactant (a) to reactant (b) ranging from 1.0 to 3.0: 1.0, provided that where reactant (a) is a single ring monohydroxy aromatic compound, the molar ratio of reactant (a) to reactant (b) ranges from 1.0 to 1.8:1.0 and from 2.2 to 3.0:1.0, wherein the crosslinking agent is essentially free of hydroxyl functionality and has a glass transition temperature of at least 25° C.

The present invention is further directed to a method for preparing the above-described crosslinking agent. The method comprises the steps of (1) combining (a) at least one mono-hydroxy aromatic compound having the structure (I) where $R_1$, $R_2$, $R_2'$, $R_3$ and $R_3'$ are as described above for that structure and (b) at least one aminotriazine compound having one or less non-alkylated NH group, in a molar ratio of (a) to (b) ranging from 1.0 to 3.0:1.0, provided that where reactant (a) is a single ring monohydroxy aromatic compound, the molar ratio of reactant (a) to reactant (b) ranges from 1.0 to 1.8:1.0 and from 2.2 to 3.0:1.0, to form a reaction admixture; (2) heating the reaction admixture of step (1) to a temperature ranging from 90° C. to 135° C.; and (3) maintaining the temperature achieved in step (2) for a time sufficient to produce an ungelled reaction product having a glass transition temperature of at least 25° C. which is essentially free of hydroxyl functionality as determined by infrared spectroscopy.

The present invention is also directed to a curable powder coating composition comprising a solid particulate, film-forming mixture of (A) a polymer having functional groups reactive with benzoxazine groups, the polymer having a glass transition temperature of at least 30° C.; and (B) the previously described crosslinking agent.

Multilayer composite coating compositions are also provided. The multilayer composite coating composition comprises a base coat deposited from a film-forming composition and a topcoat over the base coat. The topcoat is deposited from the curable powder coating composition described above.

The present invention further provides coated substrates.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As mentioned above, the crosslinking agent of the present invention comprises the ungelled reaction product of (a) at least one mono-hydroxy aromatic compound having the structure (I) as described above, and (b) at least one aminotriazine compound having one or less non-alkylated NH group (described in detail below).

By "ungelled" is meant that the reaction product can be dissolved in a suitable solvent or resin and has an intrinsic viscosity when so dissolved. The intrinsic viscosity of the reaction product is an indication of its molecular weight. A gelled reaction product, on the other hand, since it is of essentially infinitely high molecular weight, will have an intrinsic viscosity too high to measure. Moreover, the reaction product can be melted, solidified and remelted.

The substituent group $R_1$ represents a monovalent hydrocarbon, $COOR_5$ where $R_5$ represents H or a monovalent hydrocarbon group, $NO_2$, halogen or $XR_4$, where X represents O or S and $R_4$ represents a monovalent hydrocarbon group, preferably having 1 to 8 carbon atoms.

By "monovalent hydrocarbon group" is meant an organic group containing essentially carbon and hydrogen. The hydrocarbon groups may be aliphatic, aromatic, cyclic or acyclic and may contain from 1 to 24 (in the case of aromatic from 3 to 24) carbon atoms. Optionally, the hydrocarbon groups can be heteroatomic hydrocarbon groups, that is, the hydrocarbon groups can be substituted with heteroatoms, typically oxygen or nitrogen. Non-limiting examples of such monovalent hydrocarbon groups include alkyl, alkoxyl, aryl, alkylaryl or alkoxyaryl groups.

By "alkyl" is meant acyclic or cyclic alkyl groups having a carbon chain length of from $C_1$ to $C_{25}$. By "alkoxyl" is meant an alkyl group containing at least one oxygen atom, such as an ether oxygen, and having a carbon chain length of from $C_2$ to $C_{25}$, preferably of from $C_2$ to $C_8$. By alkylaryl is meant an acyclic alkyl group having a carbon chain length of from $C_2$ to $C_{25}$ and containing at least one aryl group, preferably phenyl. The aryl group(s) may optionally be substituted. Suitable substituent groups can include hydroxyl, benzyl, carboxylic acid and aliphatic groups.

The substituent groups $R_3$, $R_3'$, $R_2$ and $R_2'$ can be the same or different and each independently represents a substituent selected from H, monovalent hydrocarbon groups, $COOR_5$ where $R_5$ represents H or a monovalent hydrocarbon group, $NO_2$, halogen and $XR_4$ where X represents O or S and $R_4$ represents a monovalent hydrocarbon group, preferably having 1 to 8 carbon atoms, provided that at least one of $R_3$ and $R_3'$ is H. In a preferred embodiment of the present invention, $R_3$ and $R_3'$ both represent H.

In another preferred embodiment of the present invention, $R_1$ is an aryl group and $R_2$, $R_2'$, $R_3$ and $R_3'$ are the same or different and each independently represents H, monovalent hydrocarbon groups, $COOR_5$ where $R_5$ represents H or a monovalent hydrocarbon group, $NO_2$, halogen and $XR_4$ where X represents O or S and $R_4$ represents a monovalent hydrocarbon group, preferably having 1 to 8 carbon atoms, provided that at least one of $R_3$ and $R_3'$ is H.

Non-limiting examples of mono-hydroxy aromatic compounds suitable for use as reactant (a) in the present invention include p-cresol, 4-methoxyphenol, 4-tert-butyl phenol, 4-nitrophenol, 4-fluorophenol, 2-phenyl phenol, 4-phenyl phenol, 1-naphthol, and 2-naphthol. The preferred mono-hydroxy aromatic compound comprises 4-phenyl phenol.

Alternatively, when $R_3$ represents a substituent other than H (i.e., is "non-hydrogen substituted") and $R_3'$ is H, $R_1$ and $R_2$ taken together, $R_1$ and $R_2'$ taken together, or $R_2$ taken together with the non-hydrogen substituted $R_3$ represent fused aliphatic or aromatic ring structures; or when $R_3'$ is non-hydrogen substituted and $R_3$ is H, $R_1$ and $R_2$ taken together, $R_1$ and $R_2'$ taken together, or $R_2'$ taken together with the non-hydrogen substituted $R_3'$ represent fused aliphatic or aromatic ring structures.

In one preferred embodiment of the present invention, $R_1$ represents an electron-withdrawing group selected from aryl, alkylaryl, alkoxy, COOH, $NO_2$ and halogen.

As previously mentioned, the crosslinking agent of the present invention comprises the reaction product of at least one mono-hydroxy aromatic compound as reactant (a) (as described above) and, as reactant (b), at least one aminotriazine compound having one or less non-alkylated NH group. The aminotriazine compound (b) which has one or less non-alkylated NH bond per triazine ring can include aminoplast resins such as alkoxyalkyl derivatives of melamine, benzoguanimine, acetoguanamine, formoguanamine, spiroguanamine and the like. In a preferred embodiment of the present invention, the aminotriazine compound (b) comprises a (methoxymethyl) aminotriazine compound, for example, (methoxymethyl) melamine.

Aminoplast resins are based on the condensation products of formaldehyde, with an amino- or amido-group carrying substance. Condensation products obtained from the reaction of alcohols and formaldehyde with melamine, urea or benzoguanamine are most common and preferred herein. However, condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris (ethylamino)-1,3,5 triazine.

While the aldehyde employed is most often formaldehyde, other similar condensation products can be made from other aldehydes, for example acetaldehyde, crotonaldehyde, acrolein, benzaldehyde, furfural and glyoxal.

The aminoplast resins preferably contain methylol or other alkylol groups, and in most instances, at least a portion of these alkylol groups are etherified by a reaction with an alcohol. Any monohydric alcohol can be employed for this purpose, including such alcohols as methanol, ethanol, propanol, butanol, pentanol, hexanol, heptanol and others, as well as, benzyl alcohol and other aromatic alcohols, cyclic alcohols such as cyclohexanol, monoethers of glycols, and halogen-substituted or other substituted alcohols, such as 3-chloropropanol and butoxyethanol. Commonly employed aminoplast resins are substantially alkylated with methanol or butanol.

Preferred aminoplast resins for use as the aminotriazine compound (B) in the preparation of the crosslinking agent of the present invention are the highly alkylated, low imino aminoplast resins which have a degree of polymerization ("DP") of less than 1.5. Generally, the number average degree of polymerization is defined as the average number of structural units per polymer chain (see George Odian, *Principles of Polymerization*, John Wiley & Sons (1991)). For purposes of the present invention, a DP of 1.0 would indicate a complete monomeric triazine structure, while a DP of 2.0 indicates two triazine rings joined by a methylene or methylene-oxy bridge. It should be understood that the DP values reported herein and in the claims represent average DP values as determined by gel permeation chromatography data.

Preferred aminotriazine compounds include modified melamine-formaldehyde resin, for example RESIMENE® CE-7103 commercially available from Solutia, Inc. and CYMEL® 300; ethylated-methylated benzoguanimine-formaldehyde resin, for example CYMEL® 1123; and methylated-butylated melamine-formaldehyde resin, for example CYMEL® 1135, both of which are commercially available from Cytec Industries, Inc.

The present invention is also directed to a method for preparing the above-described crosslinking agent. The mono-hydroxy aromatic compound (a) and the aminotriazine compound (b) generally are combined in a suitably equipped reaction vessel, typically with a suitable solvent and an appropriate strong acid as catalyst. Any suitable solvent can be used, with aromatic solvents being preferred. Non-limiting examples of suitable aromatic solvents include xylene, toluene, and mixtures thereof. Non-limiting examples of strong acids suitable for use as a catalyst include, but are not limited to, para-toluene sulfonic acid and dodecyl benzene sulfonic acid. Normal condensation techniques as are well-known in the art can be used.

The reaction admixture is heated to a temperature ranging from 90° C. to 135° C., preferably from 100° C. to 120° C., and held at that temperature for a period sufficient to obtain an ungelled product having a Tg of at least 25° C. The reaction is terminated when the end point (i.e., the disappearance of the OH signal) is detected by infrared spectroscopy.

It should be understood that the molar ratio of reactant (a) to reactant (b) can range from 1.0 to 4.0: 1.0, more preferably from 1 to 3:1.0 with the proviso that where reactant (a) is a single ring monohydroxy aromatic compound, the molar ratio of reactant (a) to reactant (b) ranges from 1.0 to 1.8:1.0 and from 2.2 to 3.0:1.0. Also, it should be noted that for purposes of the present invention, the theoretical molecular weight of the monomeric aminotriazine compound (that is, where DP=1) is used to calculate the "molar ratio".

Depending on the molar ratio, the resulting crosslinkers may contain different amounts of residual aminotriazine functionality. For example, in practice, one mole of monohydroxy aromatic compound (a) typically consumes two moles of reactive functionality of the aminotriazine compound (b). The above-described reaction typically results in a crosslinking agent having both reactive aminotriazine groups and benzoxazine groups. Theoretically, at a molar ratio of reactant (a) to reactant (b) of 3.0:1.0, all of the aminotriazine functionality will be consumed. A higher ratio of reactant (a) to reactant (b) typically is not desired because it can result in a crosslinking agent having residual OH functionality.

Preferably, in the preparation of the crosslinking agent of the present invention the mono-hydroxy aromatic compound (a) and the aminotriazine compound (b) are combined in a molar ratio such that the mono-hydroxy aromatic compound (a) is in excess. This results in a stable crosslinking agent which is essentially free of hydroxyl functionality. The reaction is monitored for the disappearance of hydroxyl functionality relative to an internal standard via infrared spectroscopy (i.e., the hydroxyl signal is compared to the signal of a structure which will remain essentially unchanged as the reaction proceeds to completion, for example, the C-H stretch signal).

The mechanism for the benzoxazine ring formation includes an electrophilic aromatic substitution followed by 0-alkylation, which is assisted by the formation of the benzoxazine ring structure. It should be understood that formation of the benzoxazine ring structure at the ortho-position is preferable because such a reaction at the para-position can result in an undesirable increase in molecular weight and, ultimately, gellation of the reaction.

To prevent gellation, the substituent groups on the mono-hydroxy aromatic ring should be such that the first aromatic substitution occurs at the position ortho to the phenolic OH group and the remaining positions are deactivated or blocked with respect to further electrophilic substitution reaction, or at least made to react slower than the subsequent O-alkylation reaction. To ensure that the remaining positions on the ring are deactivated with respect to further electrophilic substitution, the substituent group R. preferably represents an electron-withdrawing group.

By "electron-withdrawing group" is meant herein a substituent group which is capable of withdrawing electrons from the aromatic ring, destabilizing charge and thereby substantially deactivating all remaining positions of the aromatic ring to further electrophilic substitution. In a preferred embodiment of the present invention, the substituent $R_1$ represents an electron-withdrawing group selected from aryl, alkylaryl, alkoxy, COOH, $NO_2$ and halogen. The benzoxazine structures formed in the syntheses described above can be confirmed by NMR spectroscopy data.

By way of example, the reaction of a monomeric hexa (methoxymethyl) melamine with monohydroxy aromatic compound, for example, phenol, is represented structurally below.

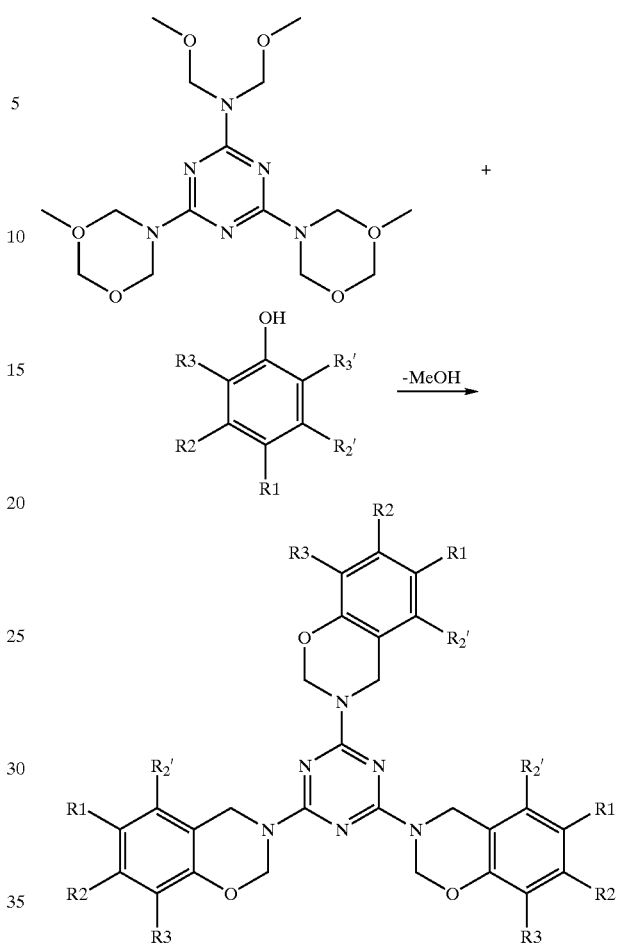

The reaction product depicted above is the theoretical product resulting from the above-described condensation reaction where the molar ratio of reactant (a) to reactant (b) is 3:1. This theoretical reaction product would contain only reactive benzoxazine groups. As mentioned above, in practice, however, the reaction typically results in a crosslinking agent having both reactive aminotriazine groups and benzoxazine groups.

The crosslinking agent of the present invention typically has a glass transition temperature of at least 25° C., preferably at least 30° C., more preferably at least 35° C., and even more preferably at least 40° C. Also, the crosslinking agent typically has a glass transition temperature less than 100° C., preferably less than 85° C., more preferably less than 75° C., and even more preferably less than 70° C. The glass transition temperature of the crosslinking agent can range between any combination of these values, inclusive of the recited values. The $T_g$ of the crosslinking agent can be measured experimentally using differential scanning calorimetry (rate of heating 10° C. per minute, $T_g$ taken at the first inflection point). Unless otherwise indicated, the stated $T_g$ as used herein refers to the measured $T_g$.

The present invention is also directed to curable powder coating compositions comprising (A) a polymer having functional groups reactive with benzoxazine groups (as well as aminotriazine groups) and having a glass transition temperature of at least 30° C., and (B) the crosslinking agent described above. Curable powder coatings are particulate compositions that are solid and free flowing at ambient room temperature. As mentioned above, the curable powder coating compositions of the present invention comprise, as a first component (A), at least one reactive functional group-containing polymer having a glass transition temperature of at least 30° C., e.g., a hydroxyl and/or an epoxide functional acrylic polymer, and as a second component (B), the crosslinking agent described above. The components (A) and (B) of the curable powder coating composition may each independently comprise one or more functional species, and are each present in amounts sufficient to provide cured coatings having a desirable combination of physical properties, e.g., smoothness, optical clarity, scratch resistance, solvent resistance and hardness.

As used herein, the term "reactive" refers to a functional group that forms a covalent bond with another functional group under suitable reaction conditions.

As used herein, the term "cure" as used in connection with a composition, e.g., "a curable composition," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

According to this method, the length, width, and thickness of a sample to be analyzed are first measured, the sample is tightly mounted to the Polymer Laboratories MK III apparatus, and the dimensional measurements are entered into the apparatus. A thermal scan is run at a heating rate of 3° C./min, a frequency of 1 Hz, a strain of 120%, and a static force of 0.01N, and sample measurements occur every two seconds. The mode of deformation, glass transition temperature, and crosslink density of the sample can be determined according to this method. Higher crosslink density valves indicate a higher degree of crosslinking in the coating.

Also, as used herein, the term "polymer" is meant to refer to oligomers and both homopolymers and copolymers. Unless stated otherwise, as used in the specification and the claims, molecular weights are number average molecular weights for polymeric materials indicated as "Mn" and obtained by gel permeation chromatography using a polystyrene standard in an art-recognized manner.

The polymer (A) can be any of a variety of polymers having aminoplast-reactive functional groups as are well known in the art, so long as the $T_g$ of the polymer is sufficiently high to permit the formation of a stable, solid particulate composition. The $T_g$ of the polymer (A) typically is at least 30° C., preferably at least 40° C., more preferably at least 50° C. The $T_g$ of the polymer (A) also typically is less than 130° C., preferably less than 100° C., more preferably less than 80° C. The $T_g$ of the functional group-containing polymer (A) can range between any combination of these values inclusive of the recited values.

Non-limiting examples of polymers having alkoxyalkyl aminotriazine and/or benzoxazine-reactive functional groups useful in the curable powder coating compositions of the invention as the polymer (A) include those selected from the group consisting of acrylic, polyester, polyurethane, polyepoxide and polyether polymers. The polymer (A) can comprise a wide variety of alkoxyalkyl aminotriazine and/or benzoxazine-reactive functional groups, for example hydroxyl, carboxyl, anhydride, epoxy, thiol, phenolic, amine and/or amide functional groups. The polymer (A) preferably comprises alkoxyalkyl aminotriazine/benzoxazine-reactive functional groups selected the group consisting of hydroxyl, epoxy, carboxyl and/or carbamate functional groups, with hydroxyl and/or carbamate functional groups being preferred.

In one embodiment of the present invention, the polymer (A) comprises hydroxyl and/or carbamate functional groups. Hydroxyl and/or carbamate functional group-containing acrylic polymers and/or polyester polymers are preferred. In another embodiment of the invention, the polymer (A) comprises epoxy and/or hydroxyl functional groups.

Suitable functional group-containing acrylic polymers include copolymers prepared from one or more alkyl esters of acrylic acid or methacrylic acid and, optionally, one or more other polymerizable ethylenically unsaturated monomers. Suitable alkyl esters of acrylic or methacrylic acid include methyl (meth)acrylate, ethyl (meth)acrylate, butyl (meth)acrylate. As used herein, by "(meth)acrylate" and like terms is meant both methacrylates and acrylates. Ethylenically unsaturated carboxylic acid functional monomers, for example acrylic acid and/or methacrylic acid, can also be used when a carboxylic acid functional acrylic polymer is desired. Amide functional acrylic polymers can be formed by polymerizing ethylenically unsaturated acrylamide monomers, such as N-butoxymethyl acrylamide and N-butoxyethyl acrylamide with other polymerizable ethylenically unsaturated monomers. Non-limiting examples of suitable other polymerizable ethylenically unsaturated monomers include vinyl aromatic compounds, such as styrene and vinyl toluene; nitriles, such as acrylonitrile and methacrylonitrile; vinyl and vinylidene halides, such as vinyl chloride and vinylidene fluoride and vinyl esters, such as vinyl acetate.

In one embodiment, the acrylic polymers contain hydroxyl functionality which can be incorporated into the acrylic polymer through the use of hydroxyl functional monomers such as hydroxyethyl (meth)acrylate and hydroxypropyl (meth)acrylate which may be copolymerized with the other acrylic monomers mentioned above.

The acrylic polymer can be prepared from ethylenically unsaturated, beta-hydroxy ester functional monomers. Such monomers are derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds are glycidyl ethers and esters. Suitable glycidyl ethers include glycidyl ethers of alcohols and phenols, such as butyl glycidyl ether, octyl glycidyl ether, phenyl glycidyl ether and the like. Suitable glycidyl esters include those which are commercially available from Shell Chemical Company under the tradename CARDURA® E; and from Exxon Chemical Company under the tradename GLYDEXX® –10.

Alternatively, the beta-hydroxy ester functional monomers are prepared from an ethylenically unsaturated, epoxy functional monomer, for example glycidyl methacrylate and allyl glycidyl ether, and a saturated carboxylic acid, such as a saturated monocarboxylic acid, for example, isostearic acid.

The hydroxyl group-containing acrylic polymers useful in the compositions of the present invention typically have a hydroxyl value ranging from 5 to 150, preferably from 10 to 100, and more preferably from 20 to 150.

The acrylic polymer is typically prepared by solution polymerization techniques in the presence of suitable initiators such as organic peroxides or azo compounds, for example, benzoyl peroxide or N,N-azobis(isobutylronitrile). The polymerization can be carried out in an organic solution in which the monomers are soluble by techniques conventional in the art.

Pendent and/or terminal carbamate functional groups can be incorporated into the acrylic polymer by copolymerizing the acrylic monomer with a carbamate functional vinyl monomer, such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers can include the reaction product of hydroxyethyl methacrylate, isophorone diisocyanate and hydroxypropyl carbamate. Still other carbamate functional vinyl monomers may be used, such as the reaction product of isocyanic acid (HNCO) with a hydroxyl functional acrylic or methacrylic monomer such as hydroxyethyl acrylate, and those carbamate functional vinyl monomers described in U.S. Pat. No. 3,479,328.

As is preferred, carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether.

The low molecular weight carbamate functional material derived from an alcohol or glycol ether is first prepared by reacting the alcohol or glycol ether with urea in the presence of a catalyst such as butyl stannoic acid. Suitable alcohols include lower molecular weight aliphatic, cycloaliphatic and aromatic alcohols, such as methanol, ethanol, propanol, butanol, cyclohexanol, 2-ethylhexanol and 3-methylbutanol. Suitable glycol ethers include ethylene glycol methyl ether and propylene glycol methyl ether. Propylene glycol methyl ether is preferred.

Also, hydroxyl functional acrylic polymers can be reacted with isocyanic acid yielding pendent carbamate groups. Note that the production of isocyanic acid is disclosed in U.S. Pat. No. 4,364,913. Likewise, hydroxyl functional acrylic polymers can be reacted with urea to give an acrylic polymer with pendent carbamate groups.

Epoxide functional acrylic polymers are typically prepared by polymerizing one or more epoxide functional ethylenically unsaturated monomers, e.g., glycidyl (meth)acrylate and allyl glycidyl ether, with one or more ethylenically unsaturated monomers that are free of epoxide functionality, e.g., methyl (meth)acrylate, isobornyl (meth)acrylate, butyl (meth)acrylate and styrene. Examples of epoxide functional ethylenically unsaturated monomers that may be used in the preparation of epoxide functional acrylic polymers include, but are not limited to, glycidyl (meth)acrylate, 3,4-epoxycyclohexylmethyl (meth)acrylate, 2-(3, 4-epoxycyclohexyl)ethyl (meth)acrylate and allyl glycidyl ether. Examples of ethylenically unsaturated monomers that are free of epoxide functionality include those described above as well as those described in U.S. Pat. No. 5,407,707 at column 2, lines 17 through 56, which disclosure is incorporated herein by reference. In one embodiment of the present invention, the epoxide functional acrylic polymer is prepared from a majority of (meth)acrylate monomers.

The functional group-containing acrylic polymer typically has a Mn ranging from 500 to 30,000 and preferably from 1000 to 5000. If carbamate functional, the acrylic polymer typically has a calculated carbamate equivalent weight typically within the range of 15 to 150, and preferably less than 50, based on equivalents of reactive carbamate groups.

Non-limiting examples of functional group-containing polyester polymers suitable for use as the polymer (A) in the curable powder coating compositions of the present invention can include linear or branched polyesters having hydroxyl, carboxyl and/or carbamate functionality. Such polyester polymers are generally prepared by the polyesterification of a polycarboxylic acid or anhydride thereof with polyols and/or an epoxide using techniques known to those skilled in the art. Usually, the polycarboxylic acids and polyols are aliphatic or aromatic dibasic acids and diols.

Transesterification of polycarboxylic acid esters using conventional techniques is also possible.

The polyols which usually are employed in making the polyester (or the polyurethane polymer, as described below) include alkylene glycols, such as ethylene glycol and other diols, such as neopentyl glycol, hydrogenated Bisphenol A, cyclohexanediol, butyl ethyl propane diol, trimethyl pentane diol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol, tris-hydroxyethylisocyanurate and the like. Branched polyols, such as trimethylolpropane, are preferred for use in the preparation of the polyester.

The acid component used to prepare the polyester polymer can include, primarily, monomeric carboxylic acids or anhydrides thereof having 2 to 18 carbon atoms per molecule. Among the acids which are useful are cycloaliphatic acids and anhydrides, such as phthalic acid, isophthalic acid, terephthalic acid, tetrahydrophthalic acid, hexahydrophthalic acid, methylhexahydrophthalic acid, 1,3-cyclohexane dicarboxylic acid and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. The polyester may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate can be used. Because it is readily available and low in cost, terephthalic acid is preferred.

Pendent and/or terminal carbamate functional groups may be incorporated into the polyester by first forming a hydroxyalkyl carbamate which can be reacted with the polyacids and polyols used in forming the polyester. The hydroxyalkyl carbamate is condensed with acid functionality on the polyester yielding carbamate functionality. Carbamate functional groups may also be incorporated into the polyester by reacting a hydroxyl functional polyester with a low molecular weight carbamate functional material via a transcarbamoylation process similar to the one described above in connection with the incorporation of carbamate groups into the acrylic polymers or by reacting isocyanic acid with a hydroxyl functional polyester.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

The functional group-containing polyester polymer typically has a Mn ranging from 500 to 30,000, preferably about 1000 to 5000. If carbamate functional, the polyester polymer typically has a calculated carbamate equivalent weight within the range of 15 to 150, preferably 20 to 75, based on equivalents of reactive pendent or terminal carbamate groups.

Non-limiting examples of suitable polyurethane polymers having pendent and/or terminal hydroxyl and/or carbamate functional groups include the polymeric reaction products of polyols, which are prepared by reacting the polyester polyols or acrylic polyols, such as those mentioned above, with a polyisocyanate such that the OH/NCO equivalent ratio is greater than 1:1 such that free hydroxyl groups are present in the product. Such reactions employ typical conditions for urethane formation, for example, temperatures of 60° C. to 90° C. and up to ambient pressure, as known to those skilled in the art.

The organic polyisocyanates which can be used to prepare the functional group-containing polyurethane polymer include aliphatic or aromatic polyisocyanates or a mixture of the two. Diisocyanates are preferred, although higher polyisocyanates can be used in place of or in combination with diisocyanates.

Examples of suitable aromatic diisocyanates include 4,4'-diphenylmethane diisocyanate and toluene diisocyanate. Examples of suitable aliphatic diisocyanates include straight chain aliphatic diisocyanates, such as 1,6-hexamethylene diisocyanate and trimethyl hexamethylene. Also, cycloaliphatic diisocyanates can be employed. Examples include isophorone diisocyanate, tetramethyl xylenediisocyanate and 4,4'-methylene-bis-(cyclohexyl isocyanate). Examples of suitable higher polyisocyanates include 1,2,4-benzene triisocyanate and polymethylene polyphenyl isocyanate.

Terminal and/or pendent carbamate functional groups can be incorporated into the polyurethane by reacting a polyisocyanate with a polyester polyol containing the terminal/pendent carbamate groups. Alternatively, carbamate functional groups can be incorporated into the polyurethane by reacting a polyisocyanate with a polyester polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer.

The hydroxyl and/or carbamate functional group-containing polyurethane polymers typically have a Mn ranging from 500 to 20,000, preferably from 1000 to 5000. If carbamate functional, the polyurethane polymer typically has a carbamate equivalent weight within the range of 15 to 150, preferably 20 to 75, based on equivalents of reactive pendent or terminal carbamate groups.

Although generally not preferred, for some applications it may be desirable to employ a functional group-containing polyether polymer in the curable powder coating compositions of the present invention. Suitable hydroxyl and/or carbamate functional polyether polymers can be prepared by reacting a polyether polyol with urea under reaction conditions well known to those skilled in the art. More preferably, the polyether polymer is prepared by a transcarbamoylation reaction similar to the reaction described above in connection with the incorporation of carbamate groups into the acrylic polymers.

Examples of polyether polyols are polyalkylene ether polyols which include those having the following structural formulae (II) and (III):

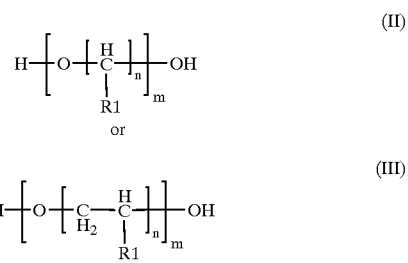

where the substituent R1 is hydrogen or lower alkyl containing from 1 to 5 carbon atoms including mixed substituents, n is typically from 2 to 6, and m is from 8 to 100 or higher. Note that the hydroxyl groups, as shown in structures (II) and (III) above, are terminal to the molecules. Included are poly(oxytetramethylene) glycols, poly(oxytetraethylene) glycols, poly(oxy-1,2-propylene) glycols and poly(oxy-1,2-butylene) glycols.

Also useful are polyether polyols formed from oxyalkylation of various polyols, for example, diols, such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds, such as sucrose or sorbitol. One commonly utilized oxyalkylation method is reaction of a polyol with an alkylene oxide, for example, propylene or ethylene oxide, in the presence of a conventional acidic or basic catalyst as known to those skilled in the art. Typical oxyalkylation reaction conditions may be employed. Preferred polyethers include those sold under the names TERATHANE® and TERACOL®, available from E. I. du Pont de Nemours and Company, Inc. and POLYMEG®, available from Q O Chemicals, Inc., a subsidiary of Great Lakes Chemical Corp.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Suitable functional group-containing polyether polymers typically have a number average molecular weight (Mn) ranging from 500 to 30,000 and preferably from 1000 to 5000. If carbamate functional, the polyether polymers have a carbamate equivalent weight of within the range of 15 to 150, preferably 25 to 75, based on equivalents of reactive pendent and/or terminal carbamate groups and the solids of the polyether polymer.

It should be understood that the preferred carbamate functional group-containing polymers typically contain residual hydroxyl functional groups which provide additional crosslinking sites. Preferably, the carbamatelhydroxyl functional group-containing polymer (A) has a residual hydroxyl value ranging from 0.5 to 10, more preferably from 1 to 10, and even more preferably from 2 to 10 (mg KOH per gram).

The functional group-containing polymer (A) typically is present in the curable powder coating compositions of the present invention in an amount ranging from at least 5 percent by weight, preferably at least 20 percent by weight, more preferably at least 30 percent by weight, and even more preferably at least 40 percent by weight based on the total weight of the film-forming composition. The functional group-containing polymer (A) also typically is present in the curable powder coating compositions of the present invention in an amount less than 90 percent by weight, preferably less than 85 percent by weight, more preferably less than 80 percent by weight, and even more preferably less than 70 percent by weight based on the total weight of the curable powder coating composition. The amount of the functional group-containing polymer (A) present in the powder coating compositions of the present invention can range between any combination of these values inclusive of the recited values.

As mentioned above, the powder coating compositions of the present invention further comprise, as component (B), the crosslinking agent described above. The crosslinking agent (B) typically is present in the powder coating compositions of the present invention in an amount ranging from at least 5 percent by weight, preferably at least 10 percent by weight, more preferably at least 15 percent by weight, and even more preferably at least 20 percent by weight based on the total weight of the powder coating composition. The crosslinking agent (B) also typically is present in the powder coating compositions of the present invention in an amount less than 90 percent by weight, preferably less than 70 percent by weight, more preferably less than 50 percent by weight, and even more preferably less than 25 percent by weight based on the total weight of the powder coating composition. The amount of the crosslinking agent (B) present in the powder coating compositions of the present invention can range between any combination of these values inclusive of the recited values.

If desired, the curable powder coating compositions of the present invention also can include an adjuvant curing agent which is different from the crosslinking agent (B). The adjuvant curing agent can be any compound having functional groups reactive with the functional groups of the polymer (A) described above. Non-limiting examples of suitable adjuvant curing agents include, for example, blocked isocyanates, triazine compounds, glycoluril resins, and mixtures thereof.

The blocked isocyanates suitable for use as the adjuvant curing agent in the powder coating compositions of the invention are known compounds and can be obtained from commercial sources or may be prepared according to published procedures. Upon being heated to cure the curable powder coating compositions, the isocyanates are unblocked and the isocyanate groups become available to react with the functional groups of the polymer (A).

Any suitable aliphatic, cycloaliphatic or aromatic alkyl monoalcohol known to those skilled in the art can be used as a blocking agent for the isocyanate. Other suitable blocking agents include oximes and lactams. Non-limiting examples of suitable blocked isocyanate curing agents include those based on isophorone diisocyanate blocked with ε-caprolactam; toluene 2,4-toluene diisocyanate blocked with ε-caprolactam; or phenol-blocked hexamethylene diisocyanate. The blocked isocyanates mentioned immediately above are described in detail in U.S. Pat. No. 4,988,793 at column 3, lines 1 to 36. Preferred blocked isocyanate curing agents include BF-1530, which is the reaction product of epsilon- caprolactam blocked T1890, a trimerized isophorone diisocyanate ("IPDI") with an isocyanate equivalent weight of 280, and BF-1540, a uretidione of IPDI with an isocyanate equivalent weight of 280, all of which are available from Creanova of Somerset, N.J.

Conventional aminoplast crosslinkers can be used as the adjuvant curing agent provided that the Tg of the coating is not lowered to an undesirable extent. A particularly preferred class of aminoplast resins include aldehyde condensates of glycoluril, such as those described above. Glycoluril resins suitable for use as the adjuvant curing agent in the curable powder coating compositions of the invention include POWDERLINK® 1174 commercially available from Cytec Industries, Inc. of Stamford, Conn.

When employed, the adjuvant curing agent typically is present in the curable powder coating compositions of the present invention in an amount ranging from 0.5 to 20 percent by weight, and preferably from 1 to 15 percent by weight based on the total weight of the curable powder coating composition.

Also suitable for use as an adjuvant curing agent in the curable powder coating compositions of the present invention are triazine compounds, such as the tricarbamoyl triazine compounds described in detail in U.S. Pat. No. 5,084,541. When used, the triazine curing agent is typically present in the powder coating composition of the present invention in an amount ranging up to about 20 percent by weight, and preferably from about 1 to 20 percent by weight, percent by weight based on the total weight of the powder coating composition.

Mixtures of the above-described curing agents also can be used advantageously.

Also, it should be understood that for purposes of the present invention, the curable powder coating compositions which contain epoxy group-containing polymers typically also include an epoxide-reactive curing (i.e., crosslinking) agent, preferably an acid functional curing agent, in addition to the crosslinking agent (B). A secondary hydroxyl group can be generated upon reaction of each epoxy functional group with a functional group of the epoxide-reactive curing agent. These secondary hydroxyl groups are then available for subsequent reaction with the aminoplast-based crosslinking agent (B).

Epoxide-reactive curing agents which can be used in curable powder coating compositions comprising an epoxide functional polymer can have functional groups selected from the group consisting of hydroxyl, thiol, primary amines, secondary amines, acid (e.g. carboxylic acid) and mixtures thereof. Useful epoxide reactive curing agents having amine functionality include, for example, dicyandiamide and substituted dicyandiamides. Preferably, the epoxide reactive curing agent has carboxylic acid groups.

In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (i.e., at the same temperature). As used herein and in the claims, by "epoxide reactive crosslinking agent" is meant that the epoxide reactive crosslinking agent has at least two functional groups that are reactive with epoxide functionality.

Preferably, the epoxide reactive crosslinking agent is a carboxylic acid functional curing agent, which contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional curing agents include those represented by the following general formula (IV),

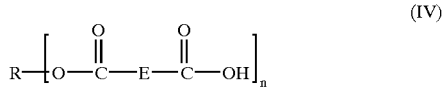

(IV)

In general formula (IV), R is the residue of a polyol, E is a divalent linking group having from 1 to 10 carbon atoms, and n is an integer of from 2 to 10. Examples of polyols from which R of general formula (IV) may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group E is preferably aliphatic.

The curing agent represented by general formula (IV) is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional curing agent. This particular curing agent can be described with reference to general formula (IV) as follows, R is the residue of trimethylol propane, E is the divalent linking group 4-methyl-1,2-cyclohexylene, and n is 3. Carboxylic acid functional curing agents described herein with reference to general formula (IV) also are meant to include any unreacted starting materials and/or co-products, e.g., oligomeric species, resulting from their preparation and contained therein.

Curable powder coating compositions comprising an epoxide functional polymer and an epoxide reactive curing agent can also include one or more cure catalysts as are well known in the art for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. When employed, the curing catalyst is typically present in the curable powder coating composition in an amount of less than 5 percent by weight, e.g., from 0.25 percent by weight to 2.0 percent by weight, based on total weight of the composition.

Curable powder coating compositions comprising epoxide functional polymers and epoxide reactive curing agents typically have present therein epoxide functional polymer in an amount ranging from 2 percent to 50 percent by weight, based on total weight of the composition, e.g., from 70 percent to 85 percent by weight, based on total weight of the composition. The epoxide reactive curing agent is typically present in the curable powder coating composition in an amount corresponding to the balance of these recited ranges, i.e., 5 to 40, particularly 15 to 30, percent by weight. The equivalent ratio of epoxide equivalents in the epoxide functional polymer to the equivalents of reactive functional groups in the curing agent is typically from 0.5:1 to 2:1, e.g., from 0.8:1 to 1.5:1.

Curable powder coating compositions of the present invention comprising an epoxide functional polymer as reactant (A) and an epoxide reactive curing agent typically contain the crosslinking agent (B) in an amount ranging from 2 to 50 weight percent, preferably from 3 to 40 weight percent and more preferably from 5 to 20 weight percent based on total weight of the powder coating composition.

The curable powder coating compositions of the present invention can further include additives as are commonly known in the art. Typical additives include benzoin, used to reduce entrapped air or volatiles; flow aids or flow control agents which aid in the formation of a smooth and/or glossy surface, for example, MODAFLOW® available from Monsanto Chemical Co., waxes such as MICROWAX® C available from Hoechst, fillers such as calcium carbonate, barium sulfate and the like; colorants, such as pigments (e.g., carbon black or Shepard Black pigments) and dyes; UV light stabilizers such as TINUVIN® 123 or TINUVIN® 900 available from cytec Industries, Inc. and catalysts to promote the various crosslinking reactions.

Such additives are typically present in the curable powder coating compositions of the present invention in an amount ranging from 5 to 50 weight percent based on total weight of the powder coating composition.

The curable powder coating compositions of the invention are typically prepared by blending the functional group-containing polymer (A) and the crosslinking agent (B), along with any adjuvants, additives and catalyst, if employed, for approximately 1 minute in a Henschel blade blender. The powder is then extruded through a Baker-Perkins twin screw extruder at a temperature ranging from 70° F. to 130° F. (21.1° C. to 54.4° C.). The finished powder then can be classified to an appropriate particle size, typically between 20 and 200 microns, in a cyclone grinder/sifter.

The curable powder coating compositions of the invention can be applied to a variety of substrates including metallic substrates, for example, aluminum and steel substrates, and non-metallic substrates, for example, thermoplastic or thermoset composite substrates. The curable powder coating compositions are typically applied by spraying, and in the case of a metal substrate, by electrostatic spraying which is preferred, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers).

Generally, after application of the curable powder coating composition, the powder coated substrate is heated to a temperature sufficient to cure the coating, typically to a temperature ranging from 250° F. to 500° F. (121.10° C. to 260.0° C.) for 1 to 60 minutes, and preferably from 300° F. to 400° F. (148.9° C. to 204.40° C.) for 15 to 30 minutes.

The curable powder coating composition can be applied as a primer or primer surfacer, or as a topcoat, for example, a "monocoat". The curable powder coating composition of the invention also can be advantageously employed as a topcoat in a multi-component composite coating composition. Such a multi-component composite coating composition generally comprises a basecoat deposited from a film-forming composition and a topcoat applied over the base coat, the topcoat being deposited from the curable powder coating composition of the present invention as described above. In a preferred embodiment, the multi-component composite coating composition is a color-plus-clear system where the basecoat is deposited from a pigmented film-forming coating composition and the topcoat is deposited from a curable powder coating composition which is substantially pigment-free, i.e., a clear coat.

The film-forming composition from which the basecoat is deposited can be any of the compositions useful in coatings applications for example, in automotive applications where color-plus-clear systems are most often used. A film-forming composition conventionally comprises a resinous binder and a pigment to serve as a colorant. Particularly useful resinous binders include acrylic polymers, polyesters including alkyds, and polyurethanes.

The resinous binders for the base coat can be organic solvent-based materials, such as those described in U.S. Pat. No. 4,220,679. Water-based coating compositions, such as those described in U.S. Pat. Nos. 4,403,003; 4,147,679; and 5,071,904, also can be used as the base coat composition.

As mentioned above, the base coat compositions also contain pigments of various types as colorants. Suitable metallic pigments include aluminum flake, bronze flake, copper flake and the like. Other examples of suitable pigments include mica, iron oxides, lead oxides, carbon black, titanium dioxide, talc, as well as a variety of color pigments.

Optional ingredients for the base coat film-forming compositions include those which are well known in the art of surface coatings and include surfactants, flow control agents, thixotropic agents, fillers, anti-gassing agents, organic co-solvents, catalysts and other suitable adjuvants.

The base coat film-forming compositions can be applied to the substrate by any of the conventional coating techniques, such as brushing, spraying, dipping or flowing, but they are most often spray-applied. The usual spray techniques and equipment for air spraying, airless spraying and electrostatic spraying can be used.

The base coat film-forming compositions are typically applied to the substrate such that a cured base coat having a film thickness ranging from 0.5 to 4 mils (12.5 to 100 micrometers) is formed thereon.

After forming a film of the base coat on the substrate, the base coat can be cured or alternatively given a drying step in which solvent, i.e., organic solvent and/or water, is driven off by heating or an air drying step before application of the clear coat. Suitable drying conditions will depend on the particular base coat film-forming composition and on the ambient humidity with certain water-based compositions. In general, a drying time ranging from 1 to 15 minutes at a temperature of 75° F. to 200° F. (21° C. to 93° C.) is adequate.

The curable powder topcoating composition can be applied over at least a portion of the base coat by any of the methods of application described above. As discussed above, the clear coat can be applied to a cured or a dried base coat before the base coat has been cured. In the latter case, the clear coat and the base coat are cured simultaneously.

Illustrating the invention are the following examples which are not to be considered as limiting the invention to their details. Unless otherwise indicated, all parts and percentages in the following examples, as well as throughout the specification, are by weight.

EXAMPLES

Examples A through C describe the preparation of benzoxazine group containing crosslinking agents of the present invention. Examples 1 through 5 describe the preparation of curable powder coating compositions.

Powder Crosslinking Agents

Example A

The following ingredients were added to a suitable reaction vessel equipped with thermometer, a mechanical stirrer, nitrogen inlet, and means for removing the methanol by-product: 480.0 parts of Cymel® 300; 340.4 parts of 4-phenyl phenol; 351.7 parts of xylene; and 0.3 part of p-toluenesulfonic acid. The mixture was heated to a temperature of approximately 80° C. and held at that temperature for 20 minutes until the mixture was homogenous. The reaction mixture was further heated to a temperature of 120° C. and maintained at that temperature as the condensation reaction by-product, methanol, was removed from the system. The reaction was monitored for the disappearance of hydroxyl functionality by infrared spectroscopy and was terminated when the end point was detected. Thereafter, the mixture was concentrated at a temperature ranging from 100° C. to 130° C. in vacuo at a pressure of 3 to 50 mm Hg to remove the xylene solvent. The reaction product thus obtained was a pale yellow solid having a softening temperature of 65° C. The benzoxazine ring structure formed in this product was confirmed by NMR spectroscopy.

Example B

The following ingredients were added to a suitable reaction vessel equipped with a thermometer, a mechanical stirrer, nitrogen inlet, and means for removing the condensation reaction by-product (methanol): 480.0 parts of Cymel® 300; 300.0 parts of 4-tert-butyl phenol; 334.4 parts of xylene; and 0.3 part of p-toluenesulfonic acid. The mixture was heated to 80° C. and held at that temperature for 20 minutes until the reaction mixture was homogenous. At that time the reaction mixture was further heated to a temperature of 120° C. and was maintained at that temperature as the methanol by-product was removed from the system. The reaction was monitored for the disappearance of hydroxyl functionality by infrared spectroscopy terminated when the end point was detected. Thereafter, the mixture was concentrated at a temperature of 100° C. to 130° C. in vacuo at a pressure of 3 to50 mm Hg to remove the xylene solvent. The reaction product thus obtained was a pale yellow solid having a softening temperature of 75° C. The benzoxazine ring structure formed in this reaction product was confirmed by NMR spectroscopy.

Example C

The following ingredients were added to a suitable reaction vessel equipped with a thermometer, a mechanical stirrer, nitrogen inlet, and means for removing the condensation reaction by-product (methanol): 480.0 parts of Cymel® 300; 288.3 parts of 2-naphthol; 329.4 parts of xylene; and 0.3 part of ptoluenesulfonic acid. The mixture was heated to a temperature of 80° C. and held at that temperature for 20 minutes until the mixture was homogenous. The reaction mixture was further heated to a temperature 120° C. and maintained at that temperature as the methanol by-product was removed from the system. The reaction was monitored for the disappearance of hydroxyl functionality by infrared spectroscopy and was terminated when the end point is detected. Thereafter, the reaction mixture was concentrated at a temperature ranging from 100° C. to 130° C. in vacuo at a pressure of 3 to 50 mm Hg to remove the xylene solvent. The reaction product thus obtained was a pale yellow solid having a softening temperature of 44° C. The benzoxazine ring structure formed in this product was confirmed by NMR spectroscopy.

Curable Powder Coating Compositions

Examples 1 through 5

Comparative Example 1 describes the preparation of a conventional powder coating composition based on an epoxy functional acrylic resin and an acid functional polyester crosslinking agent. Comparative Example 2 describes the preparation of an analogous powder coating composition which further includes a conventional glycoluril crosslinking agent, POWDERLINK® 1174 available from Cytec Industries, Inc., (for crosslinking with the secondary hydroxyl groups generated upon reaction of the epoxy and acid groups). Example 3 describes the preparation of powder coating composition of the present invention which includes the crosslinking agent of Example A as a replacement for the glycoluril crosslinking agent in Comparative Example 2. Comparative Example 4 describes the preparation of a powder coating composition based upon a hydroxyl functional polyester resin and a conventional glycoluril crosslinking agent. Example 5 describes the preparation of the analogous powder coating composition of the present invention containing the crosslinking agent of Example A as a replacement for the glycoluril crosslinking agent in Comparative Example 4. The powder coating compositions were prepared from a mixture of the following ingredients:

| INGREDI-ENTS | EXAMPLE 1 (Comparative) (weight in grams) | EXAMPLE 2 (Comparative) (weight in grams) | EXAMPLE 3 (weight in grams) | EXAMPLE 4 (Comparative) (weight in grams) | EXAMPLE 5 (weight in grams) |
|---|---|---|---|---|---|
| CRYLCOAT 291[1] | — | — | — | 270 | 270 |
| ALBESTER 5060[2] | 270 | 270 | 270 | — | — |
| Epoxy Functional Acrylic Resin[3] | 50 | 50 | 50 | — | — |
| POWDERLINK 1174 | — | 17 | — | 15 | — |
| Crosslinking agent of Example A | — | — | 47 | — | 40 |
| MODAFLOW PL 200[4] | 4 | 4 | 4 | 4 | 4 |
| Benzoin | 3.5 | 3.5 | 3.5 | 3.5 | 3.5 |
| MICROWAX C[5] | 3.0 | 3.0 | 3.0 | 3.0 | 3.0 |
| Titanium dioxide[6] | 170 | 170 | 170 | 170 | 170 |

[1]A hydroxyl functional polyester resin commercially available from UCB.
[2]An acid functional polyester resin having an acid number of approximately 30, commercially available from McWhorter Technologies, Inc.
[3]Epoxy functional acrylic resin prepared from 50% glycidyl methacrylate, 35% methylmethacrylate, 10% butyl methacrylate, 5% styrene, using t-amyl peracetate as initiator.
[4]Acrylic flow additive available from Monsanto Co.
[5]Stearamide wax commercially available from Hoechst, Inc.
[6]R706 commercially available from E. I. DuPont de Nemours and Company.

Each of the above-described powder coating compositions was prepared as follows. For each of the powder coating compositions of Examples 1 through 5, all of the listed components were blended for 10 seconds at 3500 rpm in a PRISM blender. The powders were then fed through a 19 millimeter, twin screw extruder available from b&p Process Equipment and Systems, by way of an ACCU-RATE auger feeder. The resulting chip was classified to a median particle size of approximately 40 microns.

Each of the powder coating compositions thus prepared were applied by electrostatic spray using a Nordson Versa-Spray II, corona-type spray gun to B1000 P60 DIW steel test panels (available from ACT Laboratories, Inc.) to a targeted cured film thickness of 2.0 to 3.0 mils (50 to 75 micrometers). Two panel sets were prepared wherein the coating compositions were cured at two different cure temperatures. One panel set was cured at 320° F. (160° C.) for 20 minutes, and another set was cured at 380° F. (193.3° C.) for 20 minutes.

Testing Procedures

The powder storage stability of each powder coating composition was evaluated by storing a 20 g sample of each powder coating composition at a temperature of 40° C. for a 24 hour period. The stability of the powder was determined upon visual inspection. Powder stability results are reported from best to worst as follows: excellent, good, slightly cakey, cakey, slightly clumpy, clumpy, fused and sintered.

The propensity of the coating composition to "gas" upon curing was tested by increasing the cured film thickness of the powder coating on a test panel until surface defects (i.e., pinholes) formed due to the escape of gases through the coating surface during the cure process. Values reported represent the maximum film thickness achieved just prior to the development of the pinholes in the coating surface.

Chemical resistance was evaluated by double rubs using methyl ethyl ketone. Results reported are the extent of film surface marring or softening in the area contacted with the methyl ethyl ketone after 200 double rubs.

Flexibility and impact resistance (both direct and reverse impact) was evaluated using a Gardner Impact Tester in accordance with ASTM-D-2794.

Two sets of test panels were prepared. Test results are reported in the following Table 1 for the set of test panels coated with each of the powder coating compositions of Examples 1 through 5 which were cured at 380° F. (193.3° C.) for 30 minutes. Test results for an analogous set of coated test panels which were cured at 320° F. (160° C.) for 30 minutes are reported below in the following Table 2.

TABLE 1

(380° F. (193.3° C.) for 30 minutes)

| TEST PERFORMED | Example 1 (Comparative) | Example 2 (Comparative) | Example 3 | Example 4 (Comparative) | Example 5 |
|---|---|---|---|---|---|
| MEK double rubs | slight mar | slight mar | no mar | 5 double rubs coating removed | no mar |
| Gassing | >8 mils (>200 micrometers) | >8 mils (>200 micrometers) | >8 mils (>200 micrometers) | >8 mils (>200 micrometers) | >8 mils (>200 micrometers) |
| Powder stability | slightly cakey | Sintered | excellent | sintered | excellent |
| Direct impact (in-lbs) | 30 | 30 | >60 | <10 | >30 |
| Reverse impact (in-lbs) | <20 | 30 | >30 | <10 | >30 |

TABLE 2

(320° F. (160° C.) for 30 minutes)

| TEST PERFORMED | Example 1 (Comparative) | Example 2 (Comparative) | Example 3 | Example 4 (Comparative) | Example 5 |
|---|---|---|---|---|---|
| MEK double rubs | slight mar | slight mar | slight mar | 5 double rubs coating removed | no mar |
| Gassing | >8 mils (>200 micrometers) | >8 mils (>200 micrometers) | >8 mils (>200 micrometers) | >8 mils (>200 micrometers) | >5 mils (>200 micrometers) |
| Powder stability | slightly cakey | Sintered | clumpy | sintered | clumpy |
| Direct impact (in-lbs) | 30 | 30 | >60 | <10 | >30 |
| Reverse impact (in-lbs) | <20 | 30 | >30 | <10 | >30 |

The data presented in Tables 1 and 2 above illustrate that the crosslinking agent of Example A provides powder coating compositions having improved impact resistance and enhanced powder stability over those compositions containing a conventional glycoluril crosslinking agent.

We claim:

1. A crosslinking agent having reactive benzoxazine groups comprising the ungelled reaction product of the following reactants:

(a) at least one mono-hydroxy aromatic compound having the following structure (I):

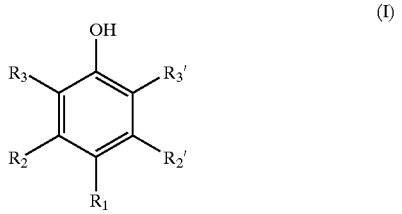

(I)

wherein $R_1$ represents a monovalent hydrocarbon group, $COOR_5$ where $R_5$ represents H or a monovalent hydrocarbon group, $NO_2$, halogen or $XR_4$, where X represents O or S and $R_4$ represents a monovalent hydrocarbon group having 1 to 8 carbon atoms;

$R_3$, $R_3'$, $R_2$ and $R_2'$ can be the same or different and each independently represents a substituent selected from H, a monovalent hydrocarbon group, $COOR_5$, $NO_2$, halogen and $XR_4$, provided that at least one of $R_3$ and $R_3'$ is H; or when $R_3'$ is non-hydrogen substituted and $R_3$ is H, $R_1$ and $R_2$ taken together, $R_1$ and $R_2'$ taken together, or $R_2$ and $R_3$ taken together represent fused aliphatic or aromatic ring structures, or when $R_3'$ is non-hydrogen substituted and $R_3$ is H, $R_1$ and $R_2$ taken together, $R_1$ and $R_2'$ taken together, or $R_2'$ and $R_3'$ taken together represent fused aliphatic or aromatic ring structures; and (b) at least one aminotriazine compound having one or less non-alkylated NH group, present in a molar ratio of reactant (a) to reactant (b) ranging from 1.0 to 3.0: 1.0, provided that where reactant (a) is a single ring monohydroxy aromatic compound, the molar ratio of reactant (a) to reactant (b) ranges from 1.0 to less than 1.8:1.0 and from greater than 2.2 to 3.0:1.0, wherein said crosslinking agent is essentially free of hydroxyl functionality and has a glass transition temperature of at least 25° C.

2. The crosslinking agent of claim 1, wherein $R_1$ represents an electron-withdrawing group selected from aryl, alkylaryl, alkoxyl, COOH, $NO_2$ and halogen.

3. The crosslinking agent of claim 1, wherein the molar ratio of reactant (a) to reactant (b) ranges from 1.0 to less than 1.8:1.0.

4. The crosslinking agent of claim 3, wherein the molar ratio of reactant (a) to reactant (b) ranges from 1.0 to 1.5:1.

5. The crosslinking agent of claim 4 wherein both $R_3$ and $R_3'$ are H.

6. The crosslinking agent of claim 1, wherein $R_1$ is an aryl group and $R_2$, $R_2'$, $R_3$ and $R_3'$ are the same or different and each independently represents H, alkyl or aryl, or a heteroatomic monovalent hydrocarbon group, provided that at least one of $R_3$ and $R_3'$ is H.

7. The crosslinking agent of claim 6, wherein reactant (a) comprises 4-phenyl phenol.

8. The crosslinking agent of claim 1, wherein reactant (a) comprises 4-phenyl phenol.

9. The crosslinking agent of claim 4, wherein reactant (a) comprises a mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol.

10. The crosslinking agent of claim 1, wherein the aminotriazine compound (b) has a degree of polymerization of 1.5 or less.

11. The crosslinking agent of claim 1, wherein the aminotriazine compound (b) comprises an (alkoxyalkyl) aminotriazine compound.

12. A method for forming a powder crosslinking agent having reactive benzoxazine groups comprising the following steps:

(1) combining the following reactants:
      (a) at least one mono-hydroxy aromatic compound having the following structure (I):

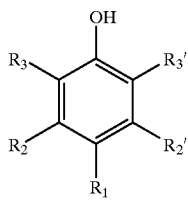

(I)

wherein R₁ represents a monovalent hydrocarbon group, COOR₅ where R₅ represents H or a monovalent hydrocarbon group, NO₂, halogen or XR₄, where X represents O or S and R₄ represents a monovalent hydrocarbon group having 1 to 8 carbon atoms;

R₃, R₃', R₂ and R₂' can be the same or different and each independently represents a substituent selected from H, a monovalent hydrocarbon group, COOR₅, NO₂, halogen and XR₄, provided that at least one of R₃ and R₃' is H; or when R₃ is non-hydrogen substituted and R₃' is H, R₁ and R₂ taken together, R₁ and R₂' taken together, or R₂ and R₃ taken together represent fused aliphatic or aromatic ring structures, or when R₃' is non-hydrogen substituted and R₃ is H, R₁ and R₂ taken together, R₁ and R₂, taken together, or R₂' and R₃' taken together represent fused aliphatic or aromatic ring structures; and (b) at least one aminotriazine compound having one or less non-alkylated NH group, in a molar ratio of (a) to (b) ranging from 1.0 to 3.0:1.0, provided that where reactant (a) is a single ring monohydroxy aromatic compound, the molar ratio of reactant (a) to reactant (b) ranges from 1.0 to less than 1.8:1.0 and from greater than 2.2 to 3.0:1.0, to form a reaction admixture;

(2) heating the reaction admixture of step (1) to a temperature ranging from 90° C. to 135° C.; and (3) maintaining the temperature achieved in step (2) for a time sufficient to produce an ungelled reaction product having a glass transition temperature of at least 25° C. which is essentially free of hydroxyl functionality as determined by infrared spectroscopy.

13. The method of claim 12, wherein R₁ represents an electron-withdrawing group selected from aryl, alkylaryl, alkoxyl, COOH, NO₂ and halogen.

14. The method of claim 12, wherein the molar ratio of reactant (a) to reactant (b) ranges from 1.0 to less than 1.8:1.0.

15. The method of claim 12, wherein R₃ and R₃' are both H.

16. The method of claim 13, wherein R₁ is an aryl group and R₂, R₂', R₃ and R₃' are the same or different and each independently represents H, alkyl or aryl, or a heteroatomic monovalent hydrocarbon group, provided that at least one of R₃ and R₃' is H.

17. The method of claim 16, wherein reactant (a) comprises 4-phenyl phenol.

18. The method of claim 12, wherein reactant (a) comprises a mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol.

19. The method of claim 12, wherein the aminotriazine compound (b) has a degree of polymerization of 1.5 or less.

20. The method of claim 12, wherein the aminotriazine compound (b) comprises an (alkoxyalkyl) aminotriazine compound.

21. The method of claim 20, wherein the aminotriazine compound (b) comprises (methoxymethyl) aminotriazine.

22. A method for forming a powder crosslinking agent, having reactive benzoxazine groups comprising the following steps:

(1) combining the following reactants:
(a) at least one mono-hydroxy aromatic compound selected from 2-phenyl phenol, 4-phenyl phenol, 1-naphthol, and 2-naphthol;and
(b) at least one (methoxymethyl) aminotriazine compound having one or less non-alkylated NH group and a degree of polymerization of 1.5 or less,
in a molar ratio of (a) to (b) ranging from 1.0 to 3:1.0, to form a reaction admixture;

(2) heating the reaction admixture of step (1) to a temperature ranging from 100° C. to 130° C.; and (3) maintaining the temperature achieved in step (2) for a time sufficient to produce an ungelled reaction product having a glass transition temperature of at least 25° C. which is essentially free of hydroxyl functionality as determined by infrared spectroscopy.

23. A curable powder coating composition comprising a solid particulate, film-forming mixture of the following components:

(A) a polymer having functional groups reactive with benzoxazine groups, said polymer having a glass transition temperature of at least 30° C.; and (B) a crosslinking agent having reactive benzoxazine groups comprising the ungelled reaction product of the following reactants:
(1) at least one mono-hydroxy aromatic compound having the following structure (I):

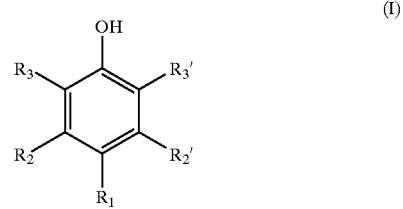

(I)

wherein R₁ represents a monovalent hydrocarbon group, COOR₅ where R₅ represents H or a monovalent hydrocarbon group, NO₂, halogen or XR₄, where X represents O or S and R₄ represents a substituent group having 1 to 8 carbon atoms;

R₃, R₃', R₂ and R₂' can be the same or different and each independently represents a substituent selected from H, a monovalent hydrocarbon group, COOR₅, NO₂, halogen and XR₄, provided that at least one of R₃ and R₃' is H;

or, when R₃ is non-hydrogen substituted and R₃' is H, R₁ and R₂ taken together, R₁ and R₂', taken together, or R₂ and R₃ taken together represent fused aliphatic or aromatic ring structures, or when R₃' is non-hydrogen substituted and R₃ is H, R₁ and R₂ taken together, R₁ and R₂, taken together, or R₂' and R₃' taken together represent fused aliphatic or aromatic ring structures; and (2) at least one aminotriazine compound having one or less non-alkylated NH group,
present in a molar ratio of reactant (a) to reactant (b) ranging from 1.0 to 3.0:1.0, provided that where reactant (a) is a single ring monohydroxy aromatic compound, the molar ratio of reactant (a) to reactant (b) ranges from 1.0 to less than 1.8:1.0 and from greater than 2.2 to 3.0:1.0, wherein said crosslinking agent is essentially free of hydroxyl functionality and has a glass transition temperature of at least 25° C.

24. The curable powder coating composition of claim 23, wherein the polymer (A) is selected from the group consisting of acrylic, polyester, polyurethane, polyepoxide and polyether polymers and mixtures thereof.

25. The curable powder coating composition of claim 23, wherein the polymer (A) comprises functional groups selected from the group consisting of hydroxyl, primary and secondary amine, carbamate, amide, thiol, phenolic, carboxyl and epoxy functional groups and mixtures thereof.

26. The curable powder coating composition of claim 25, wherein the polymer (A) comprises hydroxyl and/or carbamate functional groups.

27. The curable powder coating composition of claim 25, wherein the polymer (A) comprises hydroxyl and/or epoxy functional groups.

28. The curable powder coating composition of claim 23, wherein the polymer (A) has a glass transition temperature ranging from 30° C. to 80° C.

29. The curable powder coating composition of claim 23, wherein the polymer (A) is present in an amount ranging from 5 to 90 percent by weight based on total weight of the composition.

30. The curable powder coating composition of claim 23, wherein $R_1$ represents an electron-withdrawing group selected from aryl, alkylaryl, alkoxyl, COOH, $NO_2$ and halogen.

31. The curable powder coating composition of claim 23, wherein the molar ratio of reactant (1) to reactant (2) ranges from 1.0 to less than 1.8:1.0.

32. The curable powder coating composition of claim 23, wherein $R_3$ and $R_3'$ are both H.

33. The curable powder coating composition of claim 23, wherein $R_1$ is an aryl group and $R_2$, $R_2'$, $R_3$ and $R_3'$ are the same or different and each independently represents H, alkyl or aryl, or a heteroatomic monovalent hydrocarbon group, provided that at least one of $R_3$ and $R_3'$ is H.

34. The curable powder coating composition of claim 33, wherein $R_1$ comprises a phenyl group.

35. The curable powder coating composition of claim 23, wherein reactant (1) comprises a mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol.

36. The curable powder coating composition of claim 23, wherein the aminotriazine compound (2) has a degree of polymerization of 1.5 or less.

37. The curable powder coating composition of claim 23, wherein the aminotriazine compound (2) comprises an (alkoxyalkyl) aminotriazine compound.

38. The curable powder coating composition of claim 37, wherein the aminotriazine compound (2) comprises (methoxymethyl) aminotriazine.

39. The curable powder coating composition of claim 23, wherein the crosslinking agent (B) is present in an amount ranging from 5 to 90 weight percent based on total weight of the powder coating composition.

40. The curable powder coating composition of claim 23, wherein the polymer (A) comprises hydroxyl and/or epoxy functional groups.

41. The curable powder coating composition of claim 40, further comprising a crosslinking agent having carboxylic acid functional groups.

42. The powder coating composition of claim 23, wherein the powder topcoating composition comprises a solid particulate, film-forming mixture of the following components:

2 to 50 weight percent of (A) a polymer having reactive epoxy functional groups; and 2 to 50 weight percent of (B) a crosslinking agent having reactive benzoxazine groups comprising the ungelled reaction product of (1) at least one mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol; and (2) at least one (methoxymethyl) aminotriazine compound having one or less non-alkylated NH group and a degree of polymerization of less than 1.5; and 5 to 60 weight percent (C) a crosslinking agent having carboxylic acid functional groups, where weight percents are based on total weight of the powder coating composition.

43. A multilayer composite coating composition comprising a base coat deposited from a film-forming base coat composition and topcoat over the base coat, the topcoat deposited from a curable powder topcoating composition, the curable powder topcoating composition comprising a film-forming, solid particulate mixture of the following components:

(A) a polymer having functional groups reactive with benzoxazine groups, said polymer having a glass transition temperature of at least 30° C.; and (B) a crosslinking agent having reactive benzoxazine groups comprising the ungelled reaction product of the following reactants:

(1) at least one mono-hydroxy aromatic compound having the following structure (I):

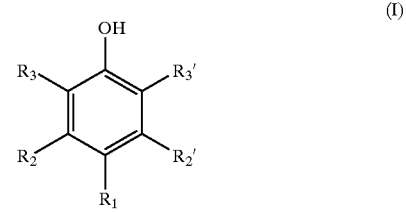

(I)

wherein $R_1$ represents a monovalent hydrocarbon group, $COOR_5$ where $R_5$ represents H or a monovalent hydrocarbon group, $NO_2$, halogen or $XR_4$, where X represents O or S and $R_4$ represents a monovalent hydrocarbon group having 1 to 8 carbon atoms;

$R_3$, $R_3'$, $R_2$ and $R_2'$ can be the same or different and each independently represents a substituent selected from H, a monovalent hydrocarbon group, $COOR_5$, $NO_2$, halogen and $XR_4$, provided that at least one of $R_3$ and $R_3'$ is H;

or, when $R_3$ is non-hydrogen substituted and $R_3'$ is H, $R_1$ and $R_2$ taken together, $R_1$ and $R_2'$ taken together, or $R_2$ and $R_3$ taken together represent fused aliphatic or aromatic ring structures, or when $R_3'$ is non-hydrogen substituted and $R_3$ is H, $R_1$ and $R_2$ taken together, $R_1$ and $R_2$, taken together, or $R_2'$ and $R_3'$ taken together represent fused aliphatic or aromatic ring structures; and (2) at least one aminotriazine compound having one or less non-alkylated NH group, present in a molar ratio of reactant (a) to reactant (b) ranging from 1.0 to 3.0:1.0, provided that where reactant (a) is a single ring monohydroxy aromatic compound, the molar ratio of reactant (a) to reactant (b) ranges from 1.0 to less than 1.8:1.0 and from greater than 2.2 to 3.0:1.0, wherein said crosslinking agent is essentially free of hydroxyl functionality and has a glass transition temperature of at least 25° C.

44. The multilayer composite coating composition of claim 43, wherein the polymer (A) is selected from the group consisting of acrylic, polyester, polyurethane, polyepoxide and polyether polymers and mixtures thereof.

45. The multilayer composite coating composition of claim 43, wherein the polymer (A) comprises functional groups selected from the group consisting of hydroxyl, primary and secondary amine, carbamate, amide, thiol, phenolic, carboxyl and epoxy functional groups and mixtures thereof.

46. The multilayer composite coating composition of claim 45, wherein the polymer (A) comprises hydroxyl and/or carbamate functional groups.

47. The multilayer composite coating composition of claim 45, wherein the polymer (A) comprises hydroxyl and/or epoxy functional groups.

48. The multilayer composite coating composition of claim 43, wherein the polymer (A) has a glass transition temperature ranging from 30° C. to 80° C.

49. The multilayer composite coating composition of claim 43, wherein the polymer (A) is present in the powder topcoating composition in an amount ranging from 5 to 90 percent by weight based on total weight of the powder topcoating composition.

50. The multilayer composite coating composition of claim 43, wherein $R_1$ represents an electron-withdrawing group selected from aryl, alkylaryl, alkoxyl, COOH, $NO_2$ and halogen.

51. The multilayer composite coating composition of claim 43, wherein the molar ratio of reactant (1) to reactant (2) ranges from 1.0 to less than 1.8: 1.0.

52. The multilayer composite coating composition of claim 43, wherein $R_3$ and $R_3$, are both H.

53. The multilayer composite coating composition of claim 43, wherein $R_1$ is an aryl group and $R_2$, $R_2'$, $R_3$ and $R_3'$ are the same or different and each independently represents H, alkyl, aryl, or a heteroatomic monovalent hydrocarbon group, provided that at least one of $R_3$ and $R_3'$ is H.

54. The multilayer composite coating composition of claim 53, wherein $R_1$ comprises a phenyl group.

55. The multilayer composite coating composition of claim 43, wherein reactant (1) comprises a mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol.

56. The multilayer composite coating composition of claim 43, wherein the aminotriazine compound (2) has a degree of polymerization of 1.5 or less.

57. The multilayer composite coating composition of claim 43, wherein the aminotriazine compound (2) comprises an (alkoxyalkyl) aminotriazine compound.

58. The multilayer composite coating composition of claim 57, wherein the aminotriazine compound (2) comprises (methoxymethyl) aminotriazine.

59. The multilayer composite coating composition of claim 43, wherein the crosslinking agent (B) is present in the powder topcoating composition in an amount ranging from 5 to 90 weight percent based on total weight of the powder topcoating composition.

60. The multilayer composite coating composition of claim 43, wherein the polymer (A) comprises hydroxyl and/or epoxy functional groups.

61. The multilayer composite coating composition of claim 60, wherein the powder topcoating composition further comprises a crosslinking agent having carboxylic acid functional groups.

62. The multilayer composite coating composition of claim 61, wherein the powder topcoating composition comprises a solid particulate, film-forming mixture of the following components:

3 to 50 weight percent of (A) a polymer having reactive epoxy functional groups; and 3 to 60 weight percent of (B) a crosslinking agent having reactive benzoxazine groups comprising the ungelled reaction product of
  (1) at least one mono-hydroxy aromatic compound selected from p-cresol, 4-methoxyphenol, 4-tert-butyl phenol, 4-nitrophenol, 4-fluorophenol, 2-phenyl phenol, 4-phenyl phenol, 1-naphthol, and 2-naphthol; and
  (2) at least one (methoxymethyl)aminotriazine compound having one or less non-alkylated NH group and a degree of polymerization of less than 1.5; and 5 to 60 weight percent (C) a crosslinking agent having carboxylic acid functional groups, where weight percents are based on total weight of the powder topcoating composition.

63. A substrate coated with the curable powder coating composition of claim 23.

64. A substrate coated with the multilayer composite coating composition of claim 43.

* * * * *

UNITED STATES PATENT AND TRADEMARK OFFICE
CERTIFICATE OF CORRECTION

PATENT NO. : 6,500,545 B1
APPLICATION NO. : 09/666175
DATED : December 31, 2002
INVENTOR(S) : Ambrose et al.

Page 1 of 1

It is certified that error appears in the above-identified patent and that said Letters Patent is hereby corrected as shown below:

Column 24, Line 10 (Claim 1)

"$R_3$'"(first appearance) should be -- $R_3$ --

Column 28, Line 22 (Claim 43)

(no period at end of line)

Column 29, Line 42 (Claim 52)

" $R_3$ " (second appearance) should be -- $R_3$' --

Signed and Sealed this

Fifth Day of December, 2006

JON W. DUDAS
*Director of the United States Patent and Trademark Office*